US008879466B2

(12) United States Patent
Park et al.

(10) Patent No.: US 8,879,466 B2
(45) Date of Patent: Nov. 4, 2014

(54) SENSOR NODE FOR USING ASYNCHRONOUS MAC

(75) Inventors: Noseong Park, Daejeon (KR); Yoonmee Doh, Daejeon (KR); Jong-Arm Jun, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 216 days.

(21) Appl. No.: 12/782,345

(22) Filed: May 18, 2010

(65) Prior Publication Data
US 2010/0322257 A1 Dec. 23, 2010

(30) Foreign Application Priority Data

May 18, 2009 (KR) .................. 10-2009-0042983
May 18, 2010 (KR) .................. 10-2010-0046276

(51) Int. Cl.
| H04J 4/00 | (2006.01) |
| H04W 74/00 | (2009.01) |
| H04L 1/16 | (2006.01) |
| H04W 88/06 | (2009.01) |
| H04W 84/18 | (2009.01) |
| H04W 28/04 | (2009.01) |
| H04W 76/04 | (2009.01) |

(52) U.S. Cl.
CPC ............. *H04W 74/00* (2013.01); *H04L 1/1692* (2013.01); *H04W 88/06* (2013.01); *H04W 84/18* (2013.01); *H04W 28/04* (2013.01); *H04W 76/048* (2013.01)
USPC ............................ 370/324; 370/329; 370/468

(58) Field of Classification Search
USPC .......................................... 370/252, 400, 468
See application file for complete search history.

(56) References Cited

U.S. PATENT DOCUMENTS

| 5,359,595 | A * | 10/1994 | Weddle et al. ................ 370/468 |
| 7,302,227 | B2 * | 11/2007 | Sakoda ......................... 455/41.2 |
| 7,733,843 | B1 * | 6/2010 | Vogl et al. ..................... 370/350 |
| 7,761,767 | B2 * | 7/2010 | Chandra et al. ............... 714/751 |
| 7,787,493 | B2 * | 8/2010 | Doi et al. ...................... 370/468 |
| 7,844,223 | B2 * | 11/2010 | Sakoda ......................... 455/41.2 |
| 7,899,074 | B2 * | 3/2011 | Park et al. ..................... 370/438 |
| 8,031,583 | B2 * | 10/2011 | Classon et al. ................ 370/208 |
| 8,054,769 | B2 * | 11/2011 | Suen et al. .................... 370/310 |
| 8,085,683 | B2 * | 12/2011 | Leith et al. .................... 370/252 |
| 8,089,909 | B2 * | 1/2012 | Kim et al. ..................... 370/311 |
| 8,179,780 | B2 * | 5/2012 | Kim et al. ..................... 370/208 |
| 8,379,601 | B2 * | 2/2013 | Love et al. .................... 370/334 |

(Continued)

OTHER PUBLICATIONS

Michael Buettner, et al., "X-MAC: A Short Preamble MAC Protocol for Duty-Cycled Wireless Sensor Networks", *SenSys '06*, Nov. 1-3, 2006, 14pp.

Byun, Kang-Ho, et al., "Performance of Asynchronous MAC with an Efficient Preamble Sampling Scheme for Wireless Sensor Networks", Journal of the Institute of Electronics Engineers of Korea, 2008.

(Continued)

*Primary Examiner* — Brian O'Connor
(74) *Attorney, Agent, or Firm* — Staas & Halsey LLP

(57) ABSTRACT

Provided is a Media Access Control (MAC) technology that may improve a data transmission performance in an asynchronous sensor network. The MAC technology may increase a waked-up time interval of a reception node to thereby continue to receive traffic from a transmission node, and change a frequency band where data is transmitted and received to thereby reduce occurrence of collision. Also, when the wake-up time interval of the reception node is similar to a wake-up time of a neighboring node, the wake-up time interval of the reception node may be moved to another time interval, thereby improving the data transmission performance.

9 Claims, 12 Drawing Sheets

(56) References Cited

U.S. PATENT DOCUMENTS

| | | | |
|---|---|---|---|
| 8,537,850 B2* | 9/2013 | Qin et al. | 370/445 |
| 8,542,604 B2* | 9/2013 | Nabetani et al. | 370/252 |
| 2008/0031172 A1* | 2/2008 | Nanda et al. | 370/310.1 |
| 2009/0103437 A1* | 4/2009 | Kim et al. | 370/235 |
| 2009/0122733 A1* | 5/2009 | Ruy et al. | 370/310 |

OTHER PUBLICATIONS

Yoon, Jang-Muk, et al., "SPMC-MAC: Slim Preamble Multi-Channel MAC Protocol with Transmission Power Control in Wireless Sensor Networks", J. Korea Inf. Commun. Soc. Comput. Netw. Serv. Syst., vol. 33, No. 10, pp. 876-884, Oct. 2008.

* cited by examiner

SENSOR NODE FOR USING ASYNCHRONOUS MAC

CROSS-REFERENCE TO RELATED APPLICATIONS

This application claims the priority benefit of Korean Patent Application Nos. 10-2009-0042983, filed on May 18, 2009, and 10-2010-0046276, filed on May 18, 2010, in the Korean Intellectual Property Office, the disclosures of which are incorporated herein by reference.

BACKGROUND

1. Field

One or more embodiments relate to a sensor network, and more particularly, to a method of improving a data transmission performance and reliability in a Media Access Control (MAC) protocol for an asynchronous sensor network.

2. Description of the Related Art

A sensor network may be a technique that provides services such as monitoring, tracking, reconnaissance, automation, and the like using sensor nodes having sensing, processing, and communication abilities. The sensor nodes included in the sensor network may be typically battery-operated. To maximize a life span of the sensor network, a duty cycle may need to be reduced to reduce an amount of battery consumption. To reduce the duty cycle, an asynchronous Media Access Control (MAC) protocol such as an X-MAC may be used. However, as for the asynchronous MAC protocol, contention may become severe along with an increase in a number of nodes desiring to transmitting data, resulting in a significant reduction in a data transmission performance and reliability.

SUMMARY

One or more embodiments provide a method of improving a data transmission performance and reliability of an asynchronous Media Access Control (MAC) protocol used in a sensor network.

According to an aspect of one or more embodiments, there may be provided a transmission node, including: a preamble transmission unit to transmit a preamble to a reception node using a first frequency band; a preamble acknowledgement character (ACK) reception unit to receive an ACK for the preamble from the reception node using the first frequency band; a data transmission unit to transmit data to the reception node, using a second frequency band different from the first frequency band; and a data ACK reception unit to receive, using the second frequency band, an ACK for the data from the reception node.

According to another aspect of one or more embodiments, there may be provided a to reception node, including: a preamble reception unit to receive, using a first frequency band, a preamble from a transmission node; a preamble ACK transmission unit to transmit, using the first frequency band, an ACK for the preamble to the transmission node; a data reception unit to receive data from the transmission node, using a second frequency band different from the first frequency band; and an ACK transmission unit to transmit, using the second frequency band, an ACK for the data to the transmission node.

According to still another aspect of one or more embodiments, there may be provided a reception node, including: a data reception unit to receive first data from a first transmission node; a data ACK transmission unit to transmit, to the first transmission node, an ACK for the first data; a preamble reception unit to receive, from a second transmission node, a preamble in a predetermined waiting time after transmitting the ACK for the first data; and a preamble ACK reception unit to transmit, to the second transmission node, the ACK for the preamble when receiving the preamble from the second transmission node in the predetermined waiting time.

According to yet another aspect of one or more embodiments, there may be provided a reception node, including: a packet information reception unit to receive, from a transmission node, information about a data packet to be transmitted by the transmission node; and a data packet reception unit to consecutively receive a plurality of data packets from the transmission node, the plurality of data packets being based on the information about the data packet.

According to further aspect of one or more embodiments, there may be provided a sensor node, including: a preamble reception unit to receive, from a transmission node, a preamble in a predetermined waiting time; a data transmission unit to transmit data to a reception node in a data transmission period in time; and a control unit to move the waiting time to enable the data to be preferentially transmitted when the data transmission period and the waiting time are overlapped.

According to further aspect of one or more embodiments, there may be provided a transmission node, including: a Clear Channel Assessment (CCA) performing unit to perform a CCA procedure verifying whether a channel is available in a first period in time; a mode conversion unit to convert a reception mode to a transmission mode for a second period in time when the channel is available; a preamble transmission unit to transmit a preamble to the reception node using the channel; and a preamble ACK reception unit to receive, from the reception node, an ACK for the preamble for a third period in time, wherein a length of the first period is longer than a sum of a length of the second period and a length of the third period.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
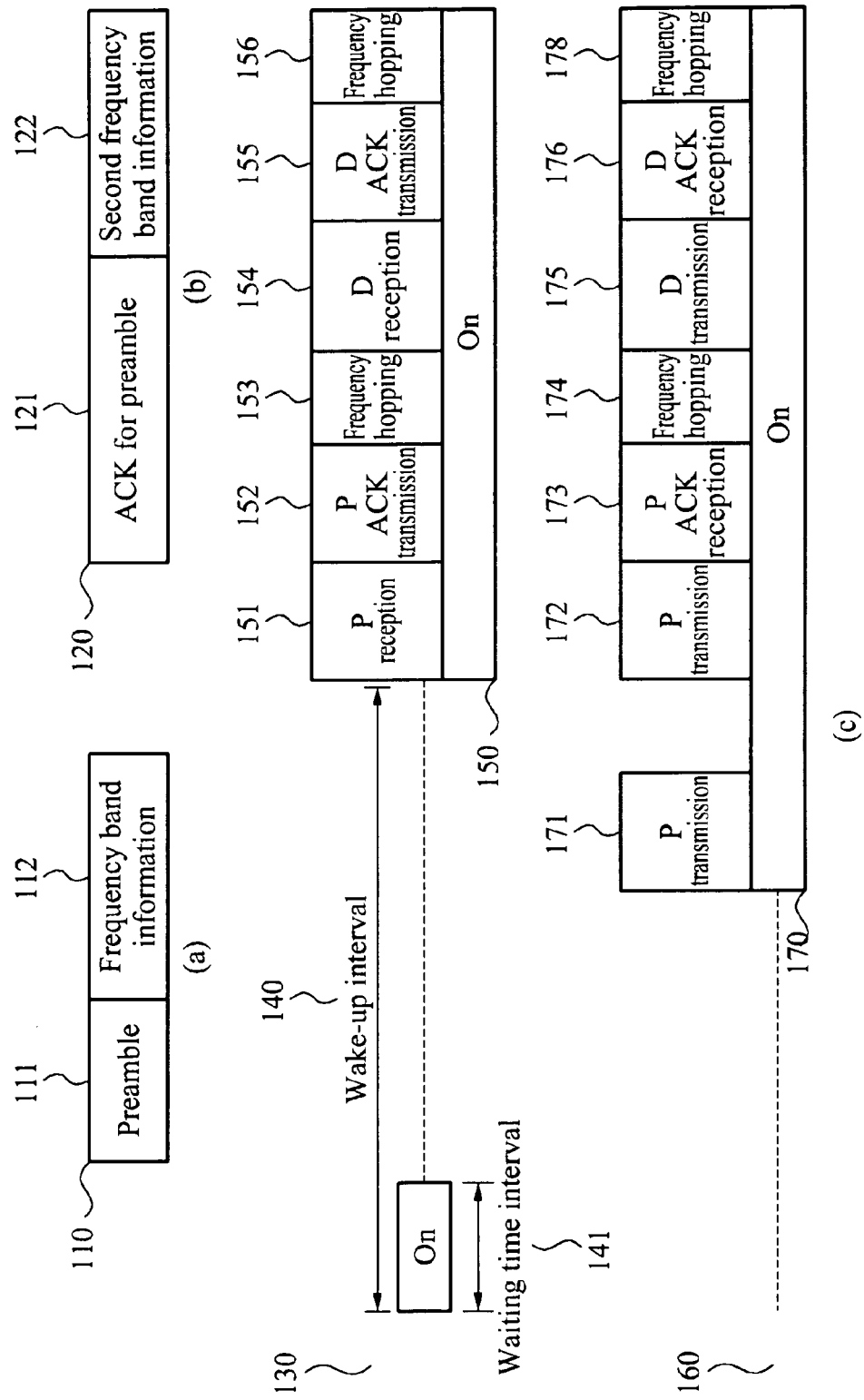
FIG. 1 is a diagram illustrating an example of performing a frequency-hopping according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a diagram illustrating an example of performing a frequency-hopping according to an embodiment.

A preamble packet including a preamble that is transmitted to a reception node 130 by a transmission node 160 is illustrated in a data packet (a) of FIG. 1, and a preamble acknowledge character (ACK) packet including a preamble ACK that is transmitted to the transmission node 160 by the reception node 130 in a data packet (b) of FIG. 1. In a section (c) of FIG. 1, the transmission node 160 and the reception node 130 transmit data using a frequency-hopping.

The reception node 130 may switch a sleep mode to an active mode for each predetermined wake-up interval 140, and receive the preamble in a waiting time interval 141. When the reception node 130 receives the preamble from the transmission node 160, the reception node 130 may determine that a data packet to be received from the transmission node 160 exists.

When the reception node 130 fails to receive the preamble, the reception node 130 may switch the active mode to the sleep mode again, thereby reducing power consumption.

Dotted lines of FIG. 1 may signify that each of the reception node 130 and the transmission node 160 stays in the sleep mode, and time intervals illustrated as 'On' of FIG. 1 may signify that each of the reception node 130 and the transmission node 160 stays in the active mode.

In FIG. 1, the transmission node 160 may switch the sleep mode to an active mode 170, and transmit the preamble in time intervals 171 and 172, using a first frequency band. The transmission node 160 may transmit a first preamble in the time interval 171, however, the reception node 130 may fail to receive the transmitted first preamble because the reception node 130 stays in the sleep mode.

The transmission node 160 may transmit, in the time interval 172, the preamble using the first frequency band. The reception node 130 may receive, in a time interval 151, the preamble using the first frequency band. The reception node 130 may transmit, in a time interval 152, an ACK for the preamble using the first frequency band. The transmission node 160 may receive an ACK for the preamble, in a time interval 173, using the first frequency band.

The transmission nod 160 and the reception node 130 may perform a frequency-hopping, in time intervals 174 and 153, from the first frequency band to a second frequency band. The first frequency band and the second frequency band are different from each other.

The transmission node 160 may transmit, in a time interval 175, a data packet to the reception node 130, using the second frequency band. The reception node 130 may receive, in a time interval 154, the data packet from the transmission node 160 using the second frequency band. The reception node 130 may transmit, in a time interval 155, an ACK for the data packet using the second frequency band. The transmission node 160 may receive, in a time interval 176, the ACK for the data packet from the reception node 130 using the second frequency band. When the above described data transmission is completed, the transmission node 160 and the reception node 130 may perform, in time intervals 178 and 156, a frequency-hopping from the second frequency band to the first frequency band.

According to an embodiment, the reception node 130 may determine the second frequency band. The transmission node 160 may transmit, to the reception node 130, information 112 about a frequency band where data is transmitted. According to an embodiment, the transmission node 160 may enable the information 112 about the frequency band to be included in a part of a preamble packet 110 including a preamble 111, and transmit the preamble packet 110.

The reception node 130 may select, as the second frequency band, one frequency band from among frequency bands capable of transmitting data, and transmit, to the transmission node 160, information 122 about the selected second frequency band. According to an embodiment, the reception node 130 may enable the information 122 about the second frequency band to be included in a part of a preamble ACK packet 120 including an ACK for the preamble 111, and transmit the preamble ACK packet 120.

According to another embodiment, the transmission node 160 may select the second frequency band. The transmission node 160 may select the second frequency band, enable the information 122 about the second frequency band to be included in the part of the preamble packet 110 including the preamble 111, and transmit the preamble packet 110.

Figure 2:
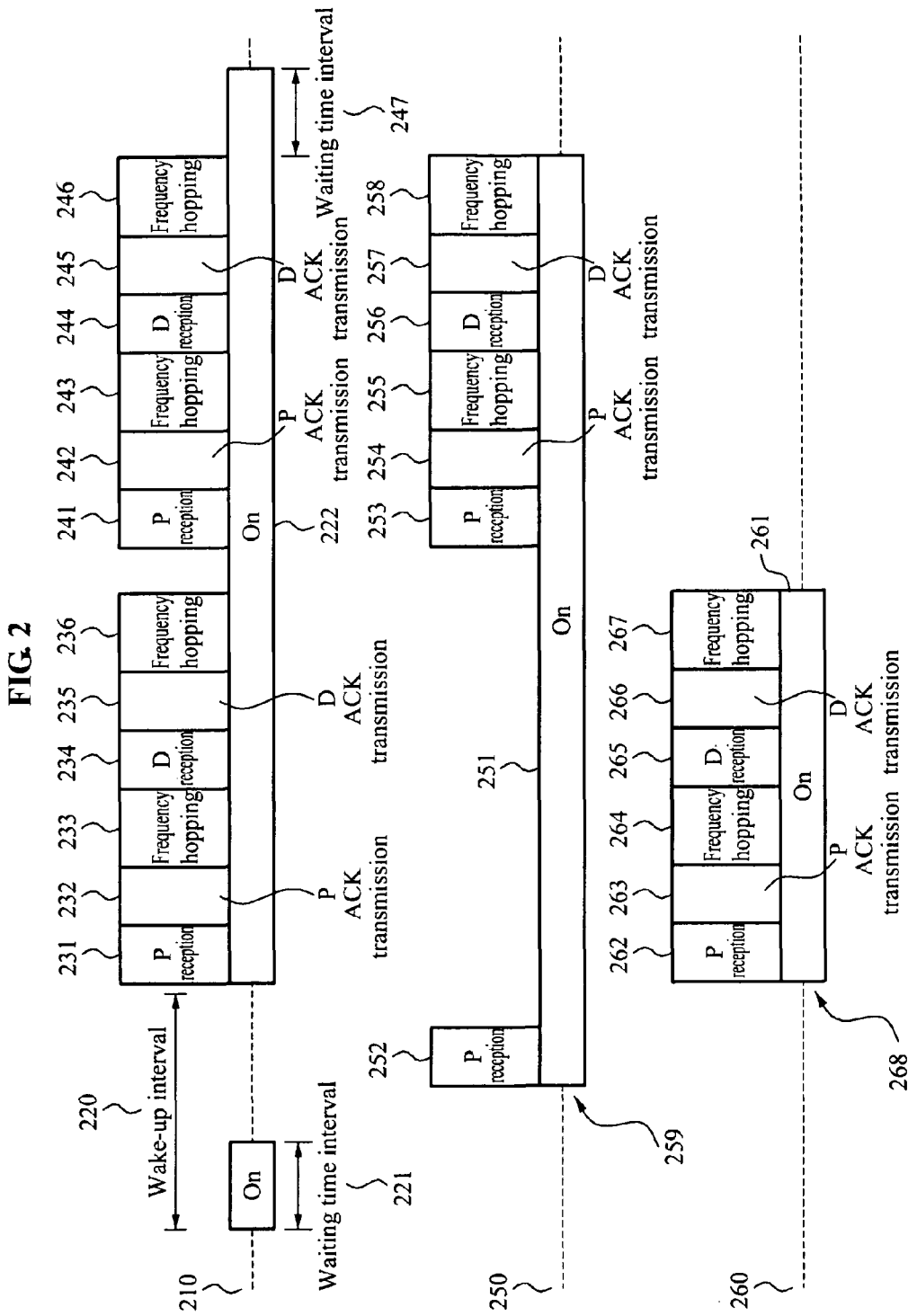
FIG. 2 is a diagram illustrating an example of postponing the entry into a sleep mode during a waiting time interval according to an embodiment.

FIG. 2 is a diagram illustrating an example of postponing the entry into a sleep mode during a waiting time according to an embodiment.

A reception node 210 may switch a sleep mode to an active mode for each wake-up interval 220, and receive a preamble. When the reception node 210 receives the preamble in a waiting time interval 221, the reception node 210 may determine that a data packet to be received from transmission nodes 250 and 260 exists. When the reception node 210 fails to receive the preamble in the waiting time interval 221, the reception node 210 may determine that the data to be received does not exist, and switch the active mode to the sleep mode again.

At a first point in time 259, a data packet to be transmitted to the reception node 210 by a first transmission node 250 may be generated. Also, at a second point in time 268, a data packet to be transmitted to the reception node 210 by a second transmission node 260 may be generated. The first transmission node 250 and the second transmission node 260 may transmit preambles 252 and 262, respectively. The preamble 252 of the first transmission node 250 and the preamble 262 of the second transmission node 260 may be competed in accordance with a carrier sense multiple access with collision detection (CSMA/CD) algorithm.

It may be assumed that the reception node 210 receives the preamble 262 of the second transmission node 260. The reception node 210 may receive, from the second transmission node 260, a preamble 231 using a first frequency band, and receive data 234 using a second frequency band. The reception node 210 may transmit an ACK 235 for data using the second frequency band. The second transmission node 260 may receive an ACK 266 for data using the second frequency band.

The reception node 210 and the second transmission node 260 may perform, in intervals 236 and 267, a frequency-hopping from the second frequency band to the first frequency band.

According to an embodiment, the reception node 210 may not switch the active mode to the sleep mode immediately after performing the frequency-hopping, and receive, from the first transmission node 250, a preamble 241 using the first frequency band in a predetermined waiting time interval. When the reception node 210 fails to receive the preamble 241 in the predetermined waiting time interval, the reception node 210 may switch the active mode to the sleep mode.

When the reception node 210 receives, from the first transmission node 250, the preamble 241 using the first frequency band within the predetermined waiting time interval, the reception node 210 may repeatedly perform the above described data reception procedure for the first transmission node 250.

The reception node 210 may receive again, from another transmission node, a preamble using the first frequency band in a predetermined waiting time interval 247 after completing the data reception procedure for the first transmission node 250.

Figure 3:
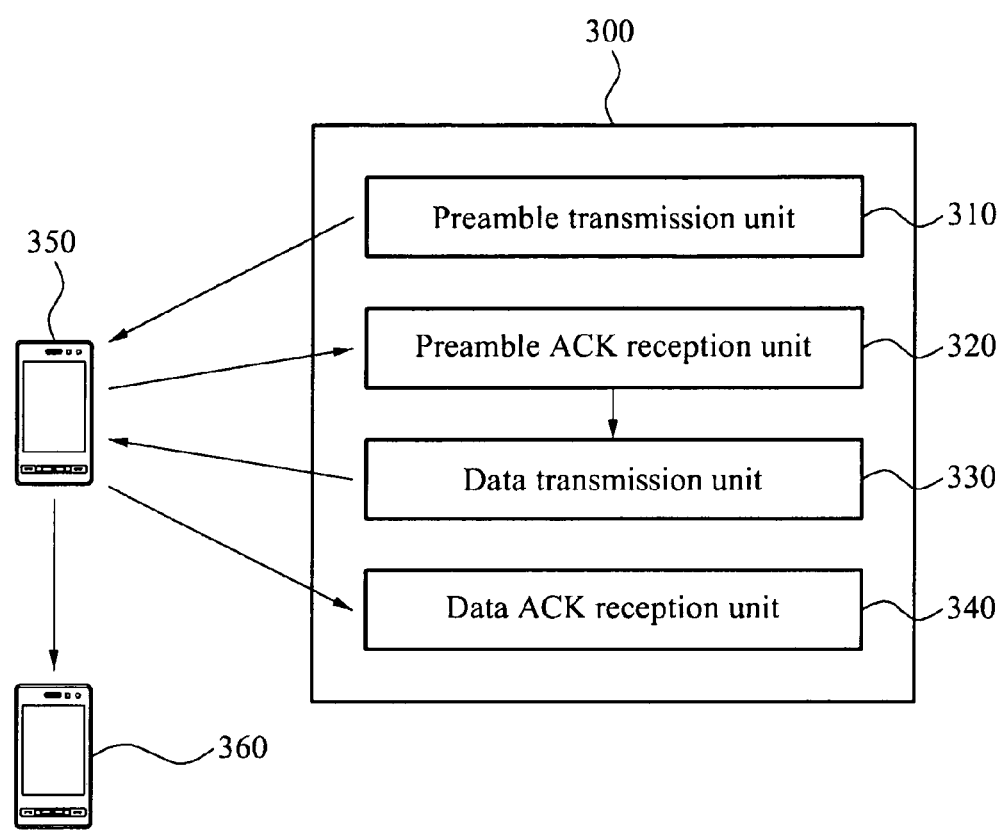
FIG. 3 is a block diagram illustrating a structure of a transmission node according to an embodiment.

FIG. 3 is a block diagram illustrating a structure of a transmission node 300 according to an embodiment.

The transmission node 300 includes a preamble transmission unit 310, a preamble ACK reception unit 320, a data transmission unit 330, and a data ACK reception unit 340.

The preamble transmission unit 310 may transmit, to the reception node 350, a preamble using a first frequency band. The reception node 350 may receive the preamble using the first frequency band, and transmit an ACK for the preamble to the transmission node 300.

The preamble ACK reception unit 320 may receive the ACK for the preamble from the reception node 350, using the first frequency band.

According to an embodiment, the preamble transmission unit 310 may transmit, to the reception node 350, information about at least one frequency band where the transmission node 300 transmits data to the reception node 350, in addition to the preamble. In this case, the reception node 350 may select, as a second frequency band, an optimal frequency band where data is received from the transmission node 300, based on information about a frequency band transmitted by the transmission node 300. The preamble ACK reception unit 320 may additionally receive information about the second frequency band, in addition to the ACK for the preamble. The first frequency band and the second frequency band may be different from each other.

According to another embodiment, the transmission node 350 may determine the second frequency band. The preamble transmission unit 310 may select, as the second frequency band, an optimal frequency band from among frequency bands where the transmission node 300 transmits data to the reception node 350, and transmit, to the reception node 350, the information about the second frequency band, in addition to the preamble. The reception node 350 may transmit data based on the information about the second frequency band received together with the preamble.

The data transmission unit 330 may perform a frequency-hopping from the first frequency band to the second frequency band. The data transmission unit 330 may transmit data to the reception node 350 using the second frequency band.

The data ACK reception unit 340 may receive, from the reception node 350, an ACK for data using the second frequency band. The data ACK reception unit 340 may perform a frequency-hopping from the second frequency band to the first frequency band.

The reception node 350 having received data may forward data to the second reception node 360.

Figure 4:
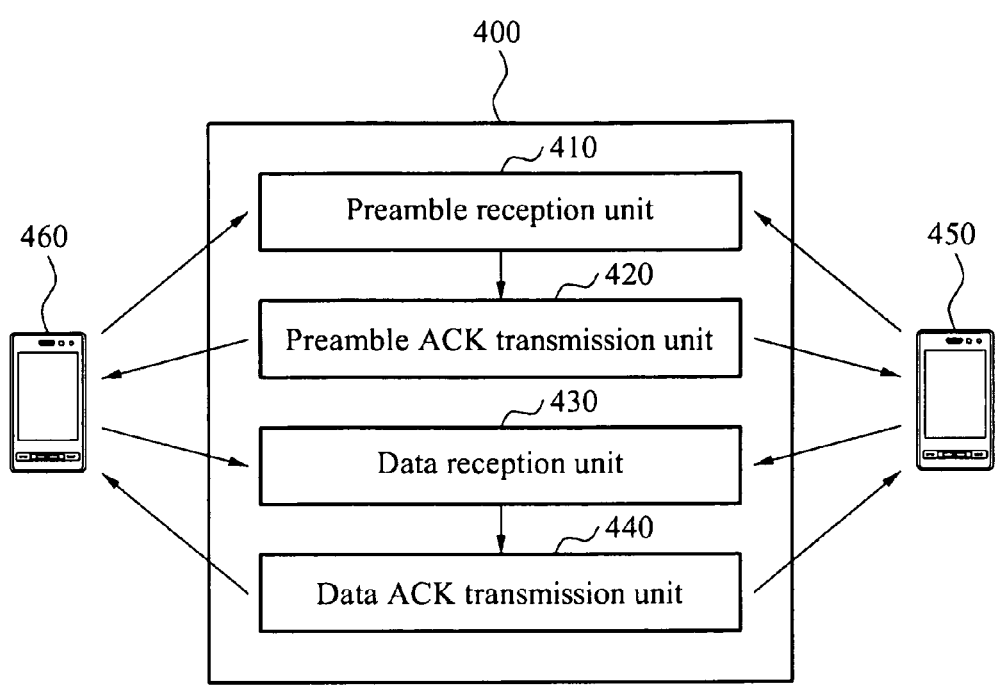
FIG. 4 is a block diagram illustrating a structure of a reception node according to an embodiment.

FIG. 4 is a block diagram illustrating a structure of a reception node 400 according to an embodiment.

The reception node 400 includes a preamble reception unit 410, a preamble ACK transmission unit 420, a data reception unit 430, and a data ACK transmission unit 440.

The preamble reception unit 410 may receive, from a first transmission node 450, a preamble using a first frequency band.

The preamble ACK transmission unit 420 may transmit, to the first transmission node 450, an ACK for the preamble using the first frequency band.

The reception node 400 may select a second frequency band where the reception node 400 receives data from the first transmission node 450. According to an embodiment, the preamble reception unit 410 may additionally receive information about at least one frequency band where data is received from the first transmission node 450, in addition to the preamble. The preamble ACK transmission unit 420 may select, as the second frequency band, an optimal frequency band from among the at least one frequency band, and transmit, to the first transmission node 450, information about the second frequency band in addition to the ACK for the preamble.

According to another embodiment, the first transmission node 450 may select a second frequency band where the reception node 400 receives data from the first transmission node 450. The first transmission node 450 may select the second frequency band from among at least one frequency band where the first transmission node 450 transmits data to the reception node 400. The preamble reception unit 410 may receive information about the second frequency band in addition to the preamble.

The data reception unit 430 may receive data from the first transmission node 450 using the second frequency band. The first frequency band and the second frequency band may be different from each other.

The data ACK transmission unit 440 may transmit, to the first transmission node 450, an ACK for data using the second frequency band. By transmitting the ACK for the data, a data reception procedure may be completed. When the data reception procedure is completed, the data ACK transmission unit 440 may perform a frequency-hopping from the second frequency band to the first frequency band.

According to an embodiment, the preamble reception unit 410 may receive, from a second transmission node 460, a second preamble using the first frequency band in a predetermined waiting time interval after transmitting the data.

When the preamble reception unit 410 receives the second preamble, the preamble ACK reception unit 420 may transmit, to the second transmission node 460, an ACK for the second preamble using the first frequency band.

The data reception unit 430 may perform a frequency-hopping from the first frequency band to a third frequency band based on the second preamble, and additionally receive second data from the second transmission node 460. According to an embodiment, the second frequency band and the third frequency band may be the same.

Since the reception node 400 additionally receives data in the active mode without switching the active mode to the sleep mode after transmitting the data, a time required for switching a mode may not be consumed, and data may be effectively received.

When the preamble reception unit 410 fails to receive the second preamble from the second transmission node 460 in a predetermined waiting time interval, the data reception unit 430 may switch the reception node 400 from the active mode to the sleep mode.

Figure 5:
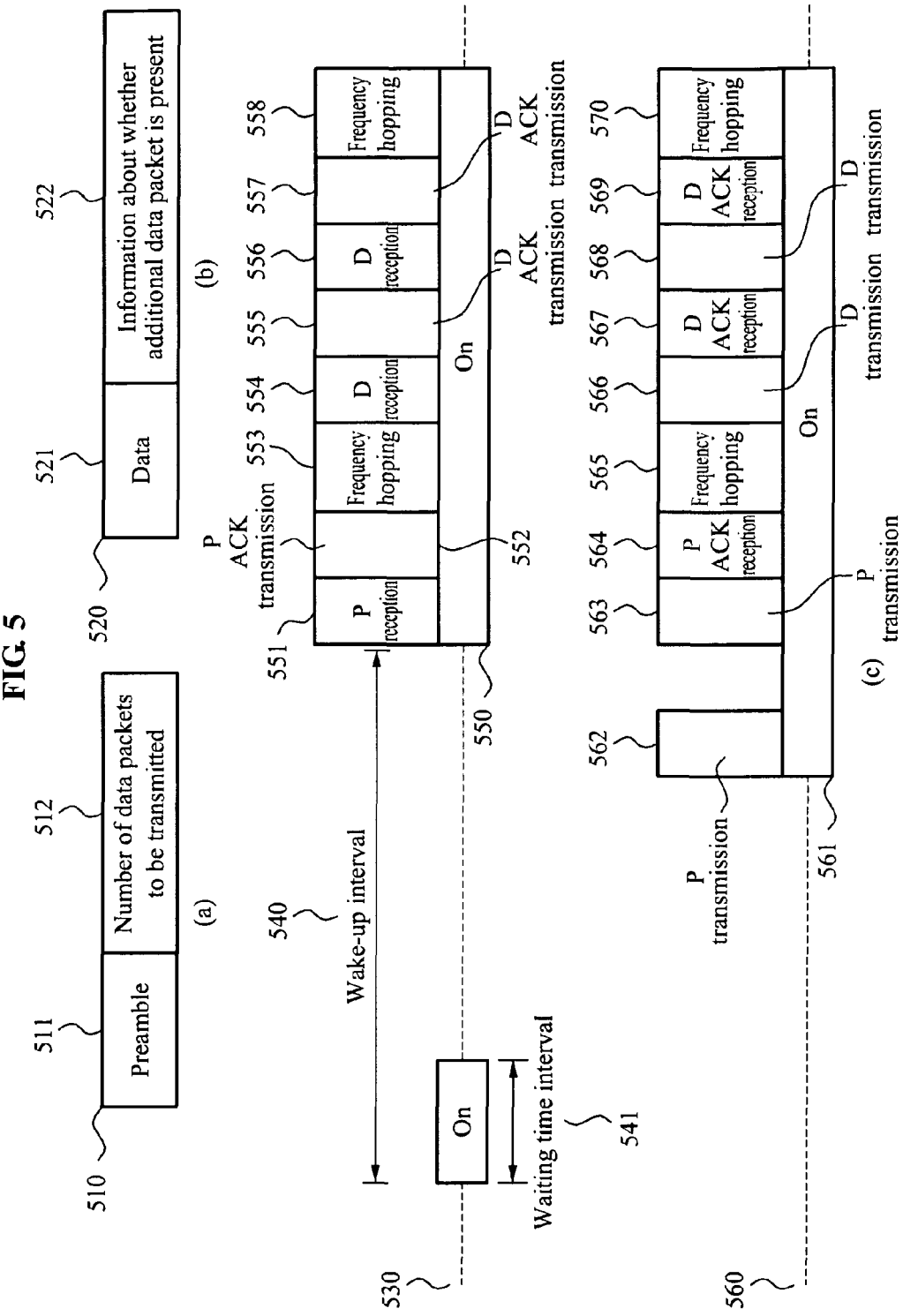
FIG. 5 is a diagram illustrating an example of transmitting a burst traffic according to an embodiment.

FIG. 5 is a diagram illustrating an example of transmitting a burst traffic according to an embodiment.

A preamble packet including a preamble that is transmitted to a reception node 530 by a transmission node 560 is illustrated in a data packet (a) of FIG. 5, and a data packet that is transmitted to the reception node 530 by the transmission node 560 is illustrated in a data packet (b) of FIG. 5. Also, in a section (c) of FIG. 5, the transmission node 560 and the reception node 530 transmit a burst traffic.

The reception node 530 may switch a sleep mode to an active mode for each predetermined wake-up interval 540, and receive a preamble in a waiting time interval 540.

To transmit data, the transmission node 560 may transmit, in a time interval 562, a preamble to the reception node 530 using a first frequency band. When the reception node 530 receives, in the time interval 562, the preamble from the transmission node 560, the reception node 530 may determine that data to be received from the transmission node 560 exists, and switch the sleep mode to the active mode to receive the data.

In FIG. 5, the reception node 530 may fail to receive the preamble transmitted, in the time interval 562, by the transmission node 560. The transmission node 560 may additionally transmit, in a time interval 563, a preamble using the first frequency band. The reception node 530 may receive, in an interval 551, a preamble, and transmit, in an interval 552, an ACK for the preamble using the first frequency band. The transmission node 560 may receive, in a time interval 564, an ACK for the preamble.

The transmission node 560 and the reception node 530 may perform a frequency hopping, in time intervals 553 and 565, from the first frequency band to the second frequency band. The transmission node 560 may transmit, in an interval 566, data using the second frequency band. The reception node 530 may receive, in an interval 554, the data, and transmit, in an interval 555, an ACK for the data. The transmission node 560 may receive, in an interval 567, an ACK for the data.

When the data transmission performed in the time interval 566 is completed, the transmission node 560 and the reception node 530 may not perform a frequency-hopping from the second frequency band to the first frequency band. The transmission node 560 may additionally transmit, in an interval 568, data using the second frequency band. The transmission node 560 and the reception node 530 may consecutively transmit a plurality of data without performing a frequency-hopping, and perform the frequency-hopping, in intervals 558 and 570, from the second frequency band to the first frequency band after the data transmission is completed.

According to an embodiment, the transmission node 560 may transmit, to the reception node 530, a number 512 of data packets to be consecutively transmitted. For example, the transmission node 560 may transmit, to the reception node 530, the number 512 of data packets that are consecutively transmitted to the reception node 530 by the transmission node 560, in addition to a preamble 511. The reception node 530 may receive a burst traffic based on the number of the data packets. When the transmission node 560 receives the number of the data packets, the reception node 530 may perform a frequency-hopping from the second frequency band to the first frequency band.

According to another embodiment, the transmission node 560 may add, to data 521, information 522 about whether an additional data packet is present, and transmit the data 521. The information 522 may denote that the additional data packet to be transmitted to the reception node 530 by the transmission node 560 is absent or present. The reception node 530 may perform a frequency-hopping from the second frequency band to the first frequency band after receiving a final data packet from the transmission node 560.

Figure 6:
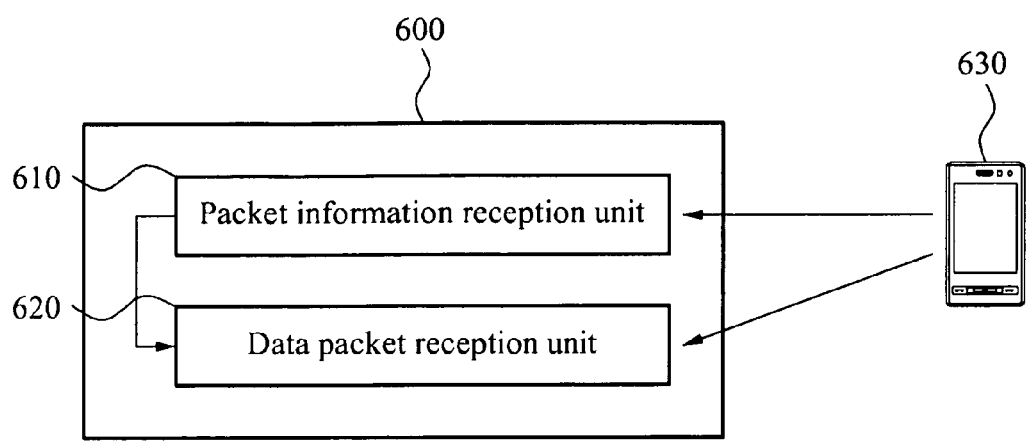
FIG. 6 is a block diagram illustrating a structure of a reception node receiving a burst traffic according to another embodiment.

FIG. 6 is a block diagram illustrating a structure of a reception node 600 receiving a burst traffic according to another embodiment. The reception node 600 includes a packet information reception unit 610 and a data packet reception unit 620.

The packet information reception unit 610 may receive, from the transmission node 630, information about a data packet to be transmitted by the transmission node 630. The information about the data packet to be transmitted by the transmission node 630 may be information about a number of data packets to be consecutively transmitted by the transmission node 630. Alternatively, the information about the data packet to be transmitted by the transmission node 630 may be information about whether the additional data packet to be transmitted by the transmission node 630 is present.

According to an embodiment, the packet information reception unit 610 may receive a preamble and information about the data packet using a first frequency band.

The data packet reception unit 620 may consecutively receive the data packet from the transmission node 630, using the information about the data packet. According to an embodiment, the data packet reception unit 620 may perform a frequency-hopping from the first frequency band to a second frequency band, and receive the data packet using the second frequency band. According to an embodiment, after a reception of a single data packet is completed, the data packet reception unit 620 may consecutively receive subsequent data packets using the second frequency band without performing the frequency-hopping from the second frequency band to the first frequency band.

When the information about the data packet is the information about the number of data packets to be transmitted by the transmission node 630, the data reception unit 620 may perform a frequency-hopping from the second frequency band to the first frequency band after receiving all data packets to be transmitted by the transmission node 630.

When the information about the data packet is the information about whether the additional data packet to be transmitted by the transmission node 630 is present, the data reception unit 620 may verify whether the additional data packet is present while receiving each of the data packets. When receiving a final data packet, the data reception unit 620 may perform the frequency-hopping from the second frequency band to the first frequency band.

According to an embodiment, the consecutively performed data reception may be impossible due to an error. When the data reception unit 620 fails to receive the data packet in a sufficient period in time, it may be determined that an error in the data reception occurs. In this case, the reception node 600 may perform the frequency-hopping from the second frequency band to the first frequency band, and re-receive the preamble from the transmission node 630 using the first frequency band.

Also, when the data reception unit 620 fails to receive the data packet in a predetermined period in time, the packet information reception unit 610 may control the reception node 600 to perform the frequency-hopping from the second frequency band to the first frequency band.

Figure 7:
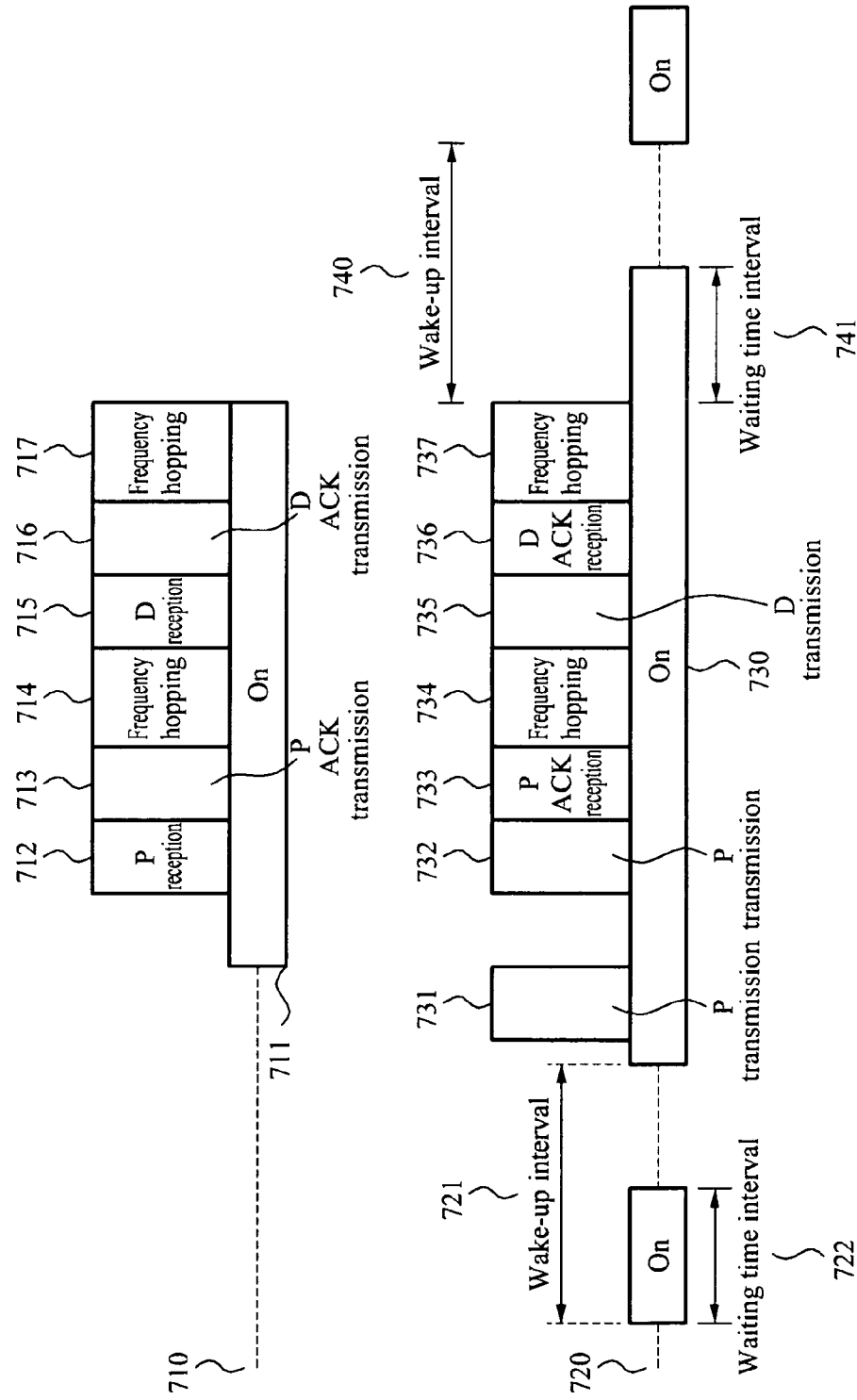
FIG. 7 is a diagram illustrating an example of changing a starting point in time of a wake-up interval when a data packet to be transmitted is generated while receiving a preamble according to an embodiment.

FIG. 7 is a diagram illustrating an example of changing a wake-up point in time when a data packet to be transmitted is generated while receiving a preamble according to an embodiment.

A sensor node 720 may ascertain a point in time when a mode of a reception node 710 is switched from a sleep mode to an active mode, and transmit a preamble starting from immediately before the mode of the reception node 710 is switched to the active mode. Thus, the sensor node 720 may not transmit unnecessarily large number of preambles, thereby reducing power consumption.

In FIG. 7, the sensor node 720 may switch a mode of the reception node 710 from the sleep mode to the active mode at the end of a wake-up interval 721. The sensor node 720 may receive the preamble from a neighboring transmission node adjacent to the sensor node 720 in a waiting time interval 722. When receiving the preamble from the neighboring transmission node, the sensor node 720 may receive data from the neighboring transmission node.

When data to be transmitted to the reception node 710 by the sensor node 720 exists, the sensor node 720 may transmit, to the reception node 710, the preamble starting from immediately before the waiting time interval 711 of the reception node 710 starts. When the preamble is successfully transmitted, the sensor node 720 may transmit the data to the reception node 710.

In this case, a time interval during which the sensor node 720 transmits the preamble to the reception node 710 and a time interval during which the sensor node 720 receives the preamble from the neighboring transmission node may be overlapped.

In this case, the sensor node 720 may change a starting point in time of the wake-up interval to another starting point in time, so that the time interval during which the sensor node 720 receives the preamble from the neighboring transmission node may be moved.

Specifically, when the time interval during which the sensor node 720 transmits the preamble to the reception node 710 and a time interval during which the sensor node 720 receives the preamble from the neighboring transmission node are overlapped, the sensor node 720 may move the time interval where the preamble is received, and thus preferentially transmitting the data.

Figure 8:
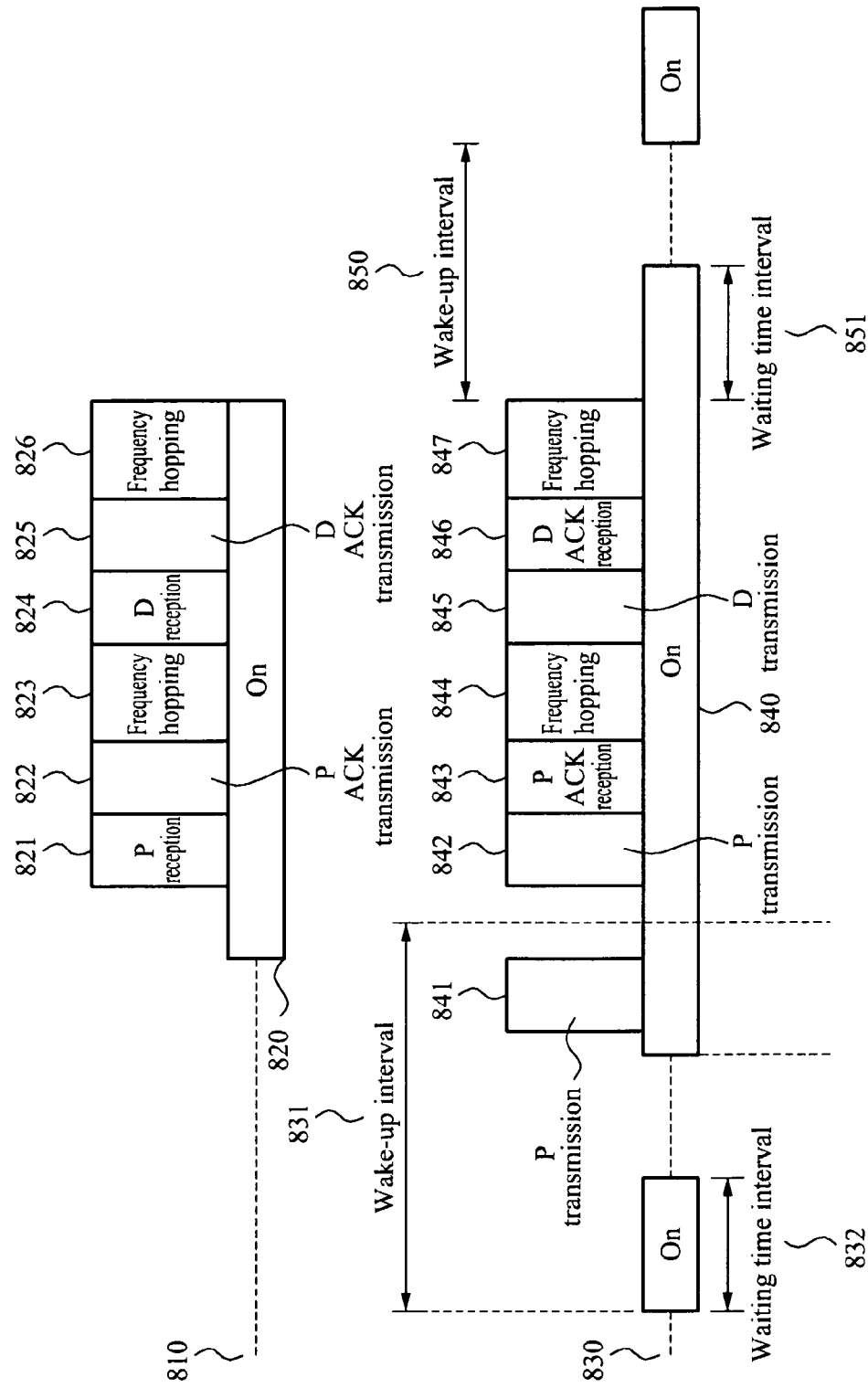
FIG. 8 is a diagram illustrating an example of changing a staring point in time of a wake-up interval when a preamble reception is generated while transmitting a data packet according to an embodiment.

FIG. 8 is a diagram illustrating an example of changing a starting point in time of a wake-up interval when a preamble reception is generated while transmitting a data packet according to an embodiment.

In general, when a wake-up interval 831 is expired, a sensor node 830 may receive a preamble from a neighboring transmission node adjacent to the sensor node 830. When receiving the preamble from the neighboring transmission node, the sensor node 830 may perform a procedure for receiving data from the neighboring transmission node.

When tracking a starting point of a wake-up interval of a reception node 810, the sensor node 830 may transmit, in a time interval 841, a preamble to the reception node 810 before the starting point in time of the wake-up interval of the reception node 810.

When the wake-up interval is expired while performing a preamble transmission in the time interval 841 and performing a data transmission in a time interval 845, a time interval during which the sensor node 830 transmits the data to the reception node 810 and a time interval during which the sensor node 830 receives the preamble from the neighboring transmission node may be overlapped. In this case, the sensor node 830 may move the time interval where the preamble is received, and thus preferentially transmitting the data.

Figure 9:
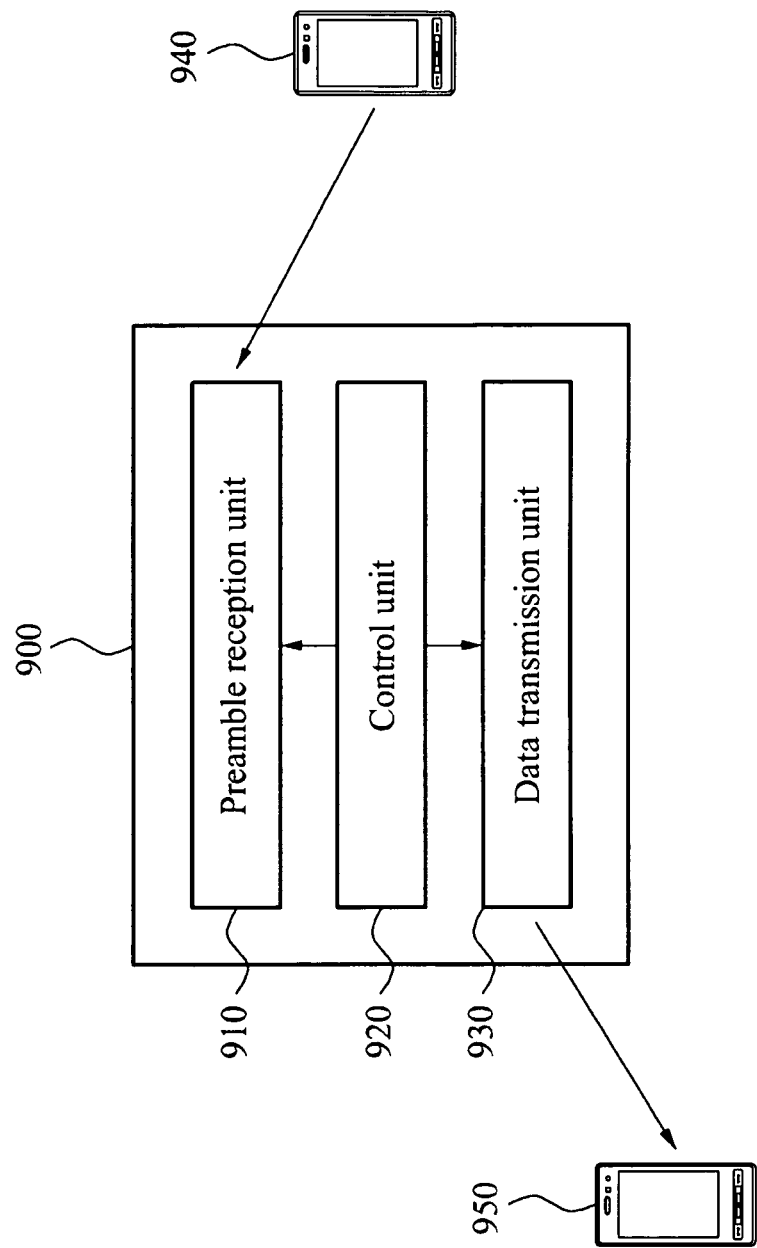
FIG. 9 is a block diagram illustrating a structure of a sensor node preferentially transmitting a data packet according to an embodiment.

FIG. 9 is a block diagram illustrating a structure of a sensor node 900 preferentially transmitting a data packet according to an embodiment. The sensor node 900 includes a preamble reception unit 910, a control unit 920, and a data transmission unit 930.

The preamble reception unit 910 may receive a preamble from a transmission node 940 in a waiting time interval.

The data transmission unit 930 may transmit data to a reception node 950 in a time interval where the data is transmitted.

When the time interval where the data is transmitted and the waiting time interval are overlapped, the control unit 920 may move the waiting time interval so that the time interval where the data is transmitted and the waiting time interval are not overlapped. In this case, the data transmission unit 930 may preferentially transmit the data to the reception node 950.

According to an embodiment, the control unit 920 may move the waiting time interval to another time interval subsequent to the time interval where the data is transmitted.

Figure 10:
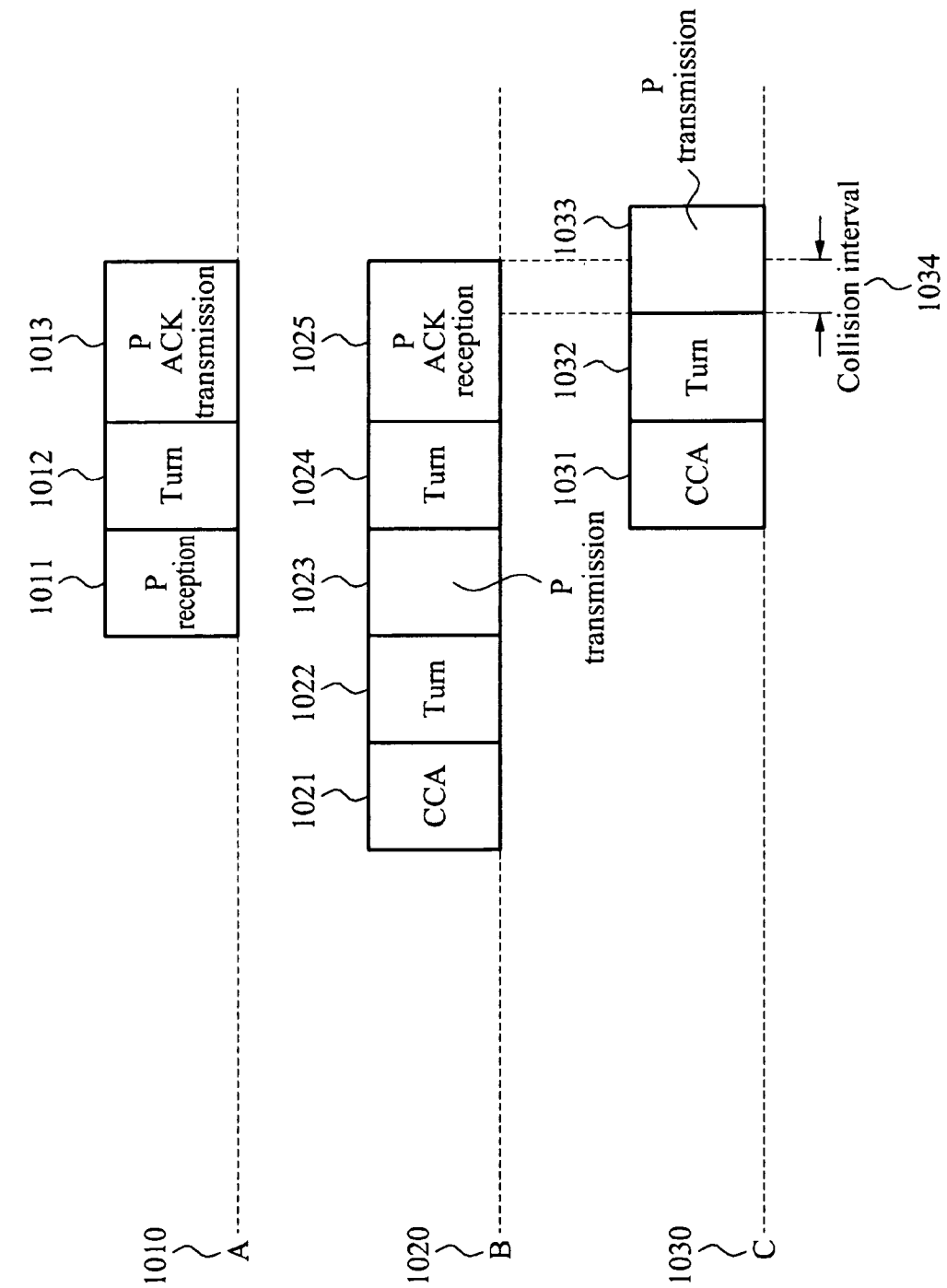
FIG. 10 is a diagram illustrating an example where a collision is generated because a time interval where a Clear Channel Assessment (CCA) is performed is shorter than a time interval where a turn operation is performed according to an embodiment.

FIG. 10 is a diagram illustrating an example where a collision is generated because a time interval where a Clear Channel Assessment (CCA) is performed is shorter than a time interval where a Turn operation is performed according to an embodiment.

In FIG. 10, a first sensor node 1010 and a second sensor node 1020 may communicate with each other, and the second sensor node 1020 and a third sensor node 1030 may communicate with each other. However, the first sensor node 1010 and the third sensor node 1030 may not communicate with each other.

The second sensor node 1020 may perform a CCA in a time interval 1021. The CCA may be a procedure for determining whether other sensor nodes use a channel, and the second sensor node 1020 may ascertain whether a signal is transmitted to the channel in a predetermined period in time to thereby determine whether the other sensor nodes use the channel.

When it is determined that the other sensor nodes do not use the channel in the predetermined period in time, the second sensor node 1020 may perform a Turn operation in a time interval 1022.

The time interval 1022 where the turn operation is performed may be a time required for switching a reception mode to a transmission mode by the second sensor node 1020. Based on an Institute of Electrical and Electronics Engineers (IEEE) 802.15.4 standard, the second sensor node 1020 may perform the turn operation in the time interval 1022, that is, a time interval of 192 μs.

The second sensor node 1020 having been switched to the transmission mode may transmit, to the first sensor node 1010, a preamble in a time interval 1023. The first sensor node 1010 may receive the preamble in a time interval 1011, and perform the turn operation in a time interval 1012 to thereby switch the reception mode to the transmission mode. Also, the second sensor node 1020 may perform the turn operation in a time interval 1024 to thereby switch the transmission mode to the reception mode again.

The first sensor node 1010 staying in the transmission mode may transmit, in a time interval 1013, an ACK for the preamble to the second reception node 1020. Also, the second sensor node 1020 staying in the reception mode may receive the ACK for the preamble in a time interval 1025.

In this case, the preamble may be transmitted so that the third sensor node 1030 transmits data to the second sensor node 1020. Specifically, the third sensor node 1030 may perform a CCA in a time interval 1031 while the first sensor node 1010 and the second sensor node 1020 perform the turn operation. Accordingly, it may be ascertained that the first sensor node 1010 and the second sensor node 1020 use the channel, however, the third sensor to node 1030 does not use the channel.

The third sensor node 1030 may switch the reception mode to the transmission mode by performing the turn operation in a time interval 1032, and transmit the preamble in a time interval 1033. In this case, a time interval during which the second sensor node 1020 receives, from the first sensor node 1010, the ACK for the preamble in a time interval 1025, and a time interval during which the third sensor node 1030 transmits the preamble in a time interval 1033 may be overlapped. Specifically, the ACK for the preamble transmitted, in the time interval 1013, by the first sensor node 1010 and the preamble transmitted, in the time interval 1033, by the third sensor node 1030 may be collided with each other.

This collision between the ACK for the preamble and the preamble may be generated because the time interval 1031 where the third sensor node 1030 performs the CCA is shorter than the time intervals 1012 and 1013 where the first sensor node 1010 performs the turn operation, and transmits the ACK for the preamble.

Accordingly, the sensor node according to an embodiment may perform the CCA in a time interval longer than a time interval during which another sensor node performs the turn operation and transmits the ACK for the preamble. When the channel is observed in the time interval longer than the time interval during which the other sensor node performs the turn operation and transmits the ACK for the preamble, a collision interval 1034 illustrated in FIG. 10 may be prevented from being generated.

Figure 11:
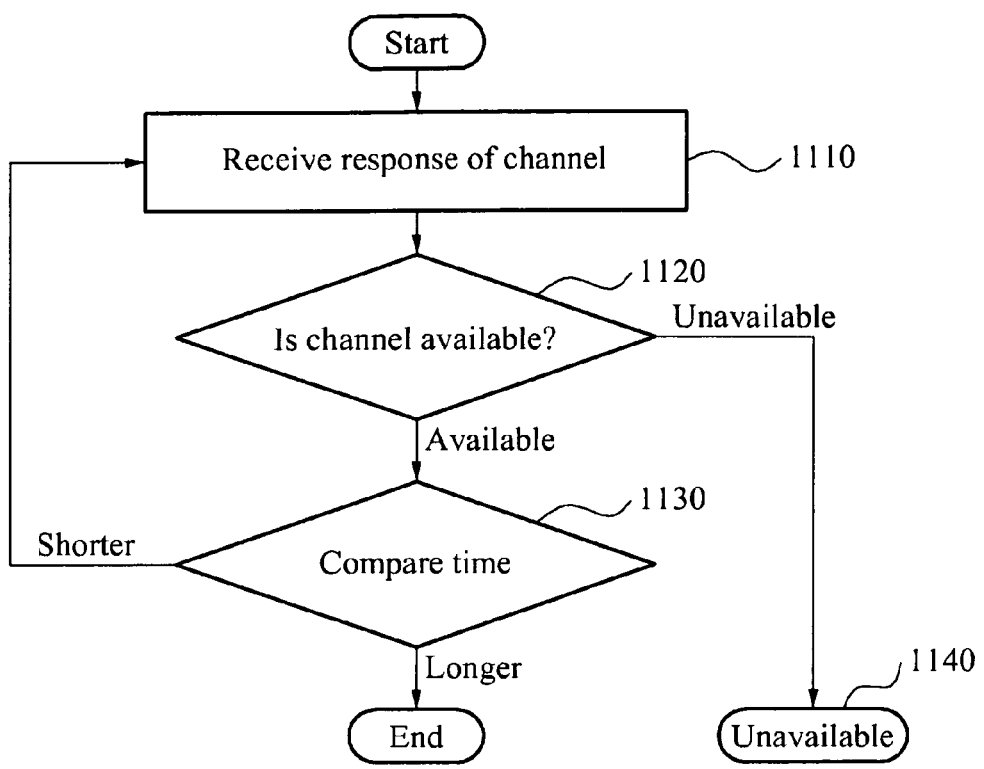
FIG. 11 is a flowchart illustrating a method of repeatedly performing a CCA to suppress occurrence of collision according to an embodiment.

FIG. 11 is a flowchart illustrating a method of repeatedly performing a CCA to suppress occurrence of collision according to an embodiment. Some of sensor nodes may not change a time interval where the CCA is performed, to be longer. In this case, by repeatedly performing the CCA, the sensor nodes may observe a channel in a time interval longer than a time interval during which another sensor node performs a turn operation, and transmits an ACK for a preamble.

In operation 1110, the sensor node may observe the channel in a predetermined period in time.

In operation 1120, the sensor node may determine whether the channel is available. When the sensor node fails to receive a signal transmitted by another sensor node in operation 1110, the sensor node may determine that the channel is available.

When the sensor node determines that the channel is unavailable, the sensor node may terminate the CCA procedure in operation 1140, and wait for a termination of the data transmission performed by the other sensor node.

When the sensor node determines that the channel is available, the sensor node may compare a time interval during which the channel is observed and a time interval during which the other sensor node performs the turn operation and transmits the ACK for the preamble.

When the time interval during which the channel is observed is longer than the time interval during which the other sensor node performs the turn operation and transmits the ACK for the preamble, the sensor node may complete the CCA procedure in operation 1150, because the sensor node observes the channel in a sufficient time interval.

When the time interval during which the channel is observed is shorter than the time interval during which the other sensor node performs the turn operation and transmits the ACK for the preamble, the sensor node may not observe the channel in the sufficient time interval. Accordingly, the sensor node may additionally perform the CCA procedure in operation 1110.

Figure 12:
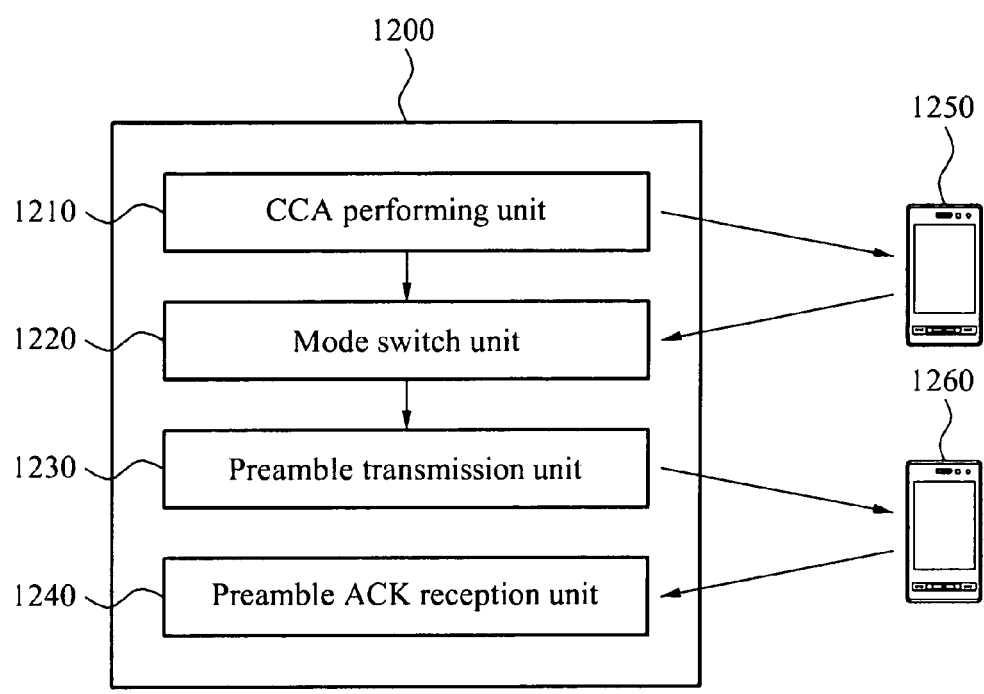
FIG. 12 is a block diagram illustrating a structure of a transmission node that repeatedly performing a CCA to suppress occurrence of collision according to an embodiment.

FIG. 12 is a block diagram illustrating a structure of a transmission node 1200 that repeatedly performing a CCA to suppress occurrence of collision according to an embodiment. The transmission node 1200 includes a CCA performing unit 1210, a mode switch unit 1220, a preamble transmission unit 1230, and a preamble ACK transmission unit 1240.

The CCA performing unit 1210 may perform a CCA procedure for verifying whether a channel is available in a first time interval. For example, the CCA performing unit 1210 may observe the channel in the first time interval, and determine whether a signal transmitted by another sensor node exists. When the sensor node fails to receive the signal transmitted by the other sensor node, the CCA performing unit 1210 may determine that the other sensor node does not the channel. In this case, the channel may be available.

When the channel is available, the mode switch unit 1220 may switch a reception mode to a transmission mode. To perform the CCA procedure, the sensor node may need to receive the signal transmitted from the other sensor node. Accordingly, the sensor node may maintain the reception mode while performing the CCA procedure. When the channel is available, the sensor node may switch the reception mode to the transmission mode to transmit a preamble and data.

The preamble transmission unit 1230 may transmit the preamble to a reception node 1260 in a third time interval, using the available channel.

The preamble ACK reception unit 1240 may receive the preamble from the reception node 1260.

In this case, the first time interval where the CCA performing unit 1210 performs the CCA procedure may be longer than a sum of a second time interval where the mode switch unit 1220 switches a mode and the third time interval where the preamble transmission unit 1230 transmits the preamble.

Some of the sensor nodes may not adjust the time interval where the CCA procedure is performed. In this case, the time interval where the CCA performing unit 1210 performs the CCA procedure may be shorter than the sum of the second time interval and the third time interval.

In this case, the CCA performing unit 1210 may repeatedly perform the CCA procedure, so that the CCA performing unit 1210 may adjust the first time interval, where whether the channel is available is observed, to be longer than the sum of the second time interval and the third time interval.

Although a few embodiments have been shown and described, it would be appreciated by those skilled in the art that changes may be made in these embodiments without departing from the principles and spirit of the disclosure, the scope of which is defined by the claims and their equivalents.

What is claimed is:
1. A transmission node, comprising:
a preamble transmitter configured to transmit a preamble to a reception node using a first frequency band, to select an optimal frequency band among frequency bands provided for transmitting data from the transmission node to the reception node, and to transmit, with the preamble, information identifying the optimal frequency band to the reception node using the first frequency band;
a preamble acknowledgement character (ACK) receiver configured to receive an ACK for the preamble from the reception node using the first frequency band;
a data transmitter configured to transmit data to the reception node, using the optimal frequency band as a second frequency band different from the first frequency band, after the preamble acknowledgement character (ACK) receiver has received the ACK for the preamble from the reception node; and
a data ACK receiver configured to receive, using the second frequency band, an ACK for the data from the reception node and to perform frequency-hopping from the second frequency band back to the first frequency band after receiving the ACK for the data from the reception node.

2. A reception node, comprising:
a preamble receiver configured to receive, using a first frequency band, a preamble from a transmission node and to receive, from the transmission node, information on frequency bands provided for transmitting data from the transmission node to the reception node;
a preamble ACK transmitter configured to select, based on the received information, an optimal frequency band from among the frequency bands and to transmit, using the first frequency band, an ACK for the preamble and information about the optimal frequency band to the transmission node;
a data receiver configured to receive data from the transmission node, using the optimal frequency band a second frequency band different from the first frequency band, after the preamble ACK transmitter has transmitted the ACK for the preamble to the transmission node; and
a data ACK transmitter configured to transmit, using the second frequency band, an ACK for the data to the transmission node and to perform frequency-hopping from the second frequency band back to the first frequency band after transmitting the ACK for the data to the transmission node.

3. A reception node, comprising:
a data reception unit to receive first data from a first transmission node;
a data ACK transmission unit to transmit, to the first transmission node, an ACK for the first data;
a preamble reception unit to receive, from a second transmission node different from the first transmission node, a preamble in a predetermined waiting time after transmitting the ACK for the first data; and
a preamble ACK transmission unit to transmit, to the second transmission node, an ACK for the preamble when receiving the preamble from the second transmission node in the predetermined waiting time.

4. The reception node of claim 3, further comprising:
a control unit to switch the reception node to a sleep mode when failing to receive the second preamble from the second transmission node in the predetermined waiting time.

5. The reception node of claim 3, wherein the data ACK transmission unit transmits the ACK for the first data using a second frequency band, and the preamble reception unit receives the second preamble using a first frequency band.

6. A sensor node, comprising:
a preamble reception unit to receive, from a transmission node, a preamble in a predetermined waiting time;
a data transmission unit to transmit data to a reception node in a data transmission period in time; and
a control unit to move the waiting time to enable the data to be preferentially transmitted when the data transmission period and the waiting time are overlapped.

7. The sensor node of claim 6, wherein the control unit moves the waiting time to be after the data transmission period.

8. A transmission node, comprising:
a Clear Channel Assessment (CCA) performing unit to perform a CCA procedure verifying whether a channel is available in a first period in time;
a mode conversion unit to convert a reception mode to a transmission mode for a second period in time when the channel is available;
a preamble transmission unit to transmit a preamble to the reception node using the channel; and
a preamble ACK reception unit to receive, from the reception node, an ACK for the preamble for a third period in time,
wherein a length of the first period is longer than a sum of a length of the second period and a length of the third period.

9. The transmission node of claim 8, wherein the CCA performing unit observes the channel for a predetermined period in time, and repeatedly observes the channel when a length of the predetermined period is shorter than the sum of the length of the second period and the length of the third period.

* * * * *